June 21, 1960  A. A. JERNANDER  2,941,854
GREASE GUN WITH SPECIAL MULTI FUNCTIONAL PLUNGER
Filed Oct. 30, 1958
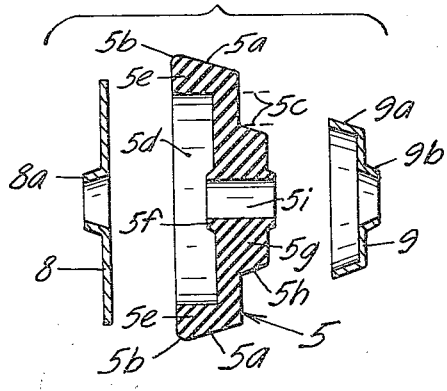
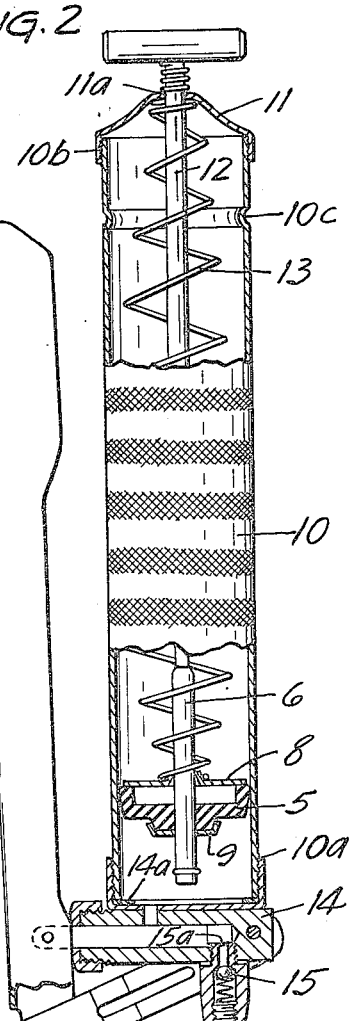
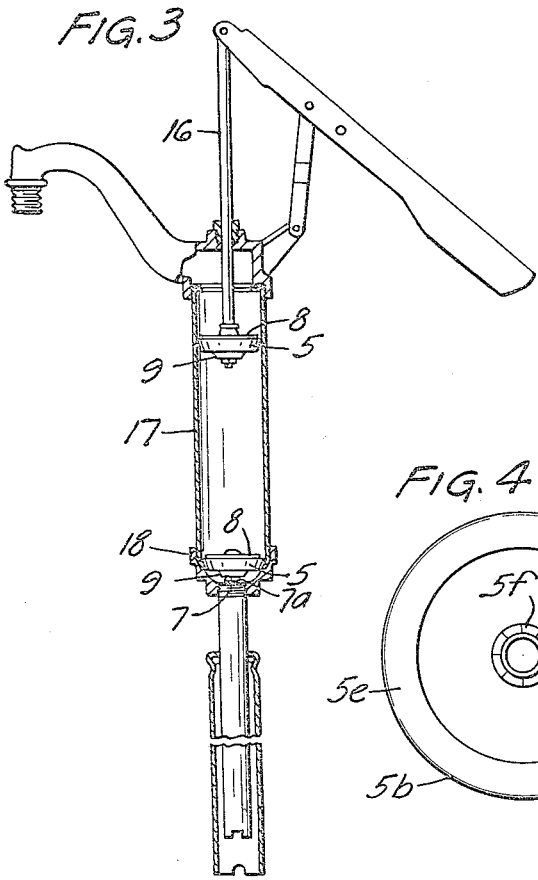
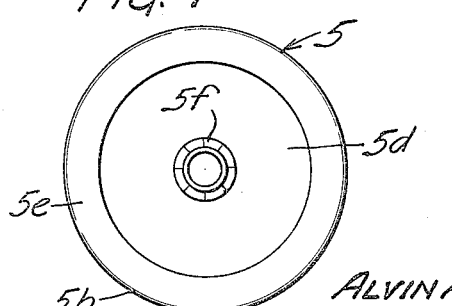
INVENTOR
ALVIN A. JERNANDER
BY
Williamson, Schroeder & Palmatier
ATTORNEYS United States Patent Office 2,941,854
Patented June 21, 1960

2,941,854

GREASE GUN WITH SPECIAL MULTI FUNCTIONAL PLUNGER

Alvin A. Jernander, Minneapolis, Minn., assignor to K-P Manufacturing Company, Minneapolis, Minn., a corporation of Minnesota Filed Oct. 30, 1958, Ser. No. 770,781

5 Claims. (Cl. 309—23)

This invention relates to a simplified and unusually efficient plunger and valve structure adapted for many uses in the control and propulsion of fluids including liquids and viscous fluids such as heavy greases.

It is an object of my invention to provide an integral plunger and valve body preferably combined with reinforcing washer structure which unexpectedly and efficiently will cooperate with cylindrical fluid-material-containing chambers or with cylindrical valve seats to efficiently maintain a sealed relation with such bodies and regardless of pressure conditions, longitudinal movement of said body or permeability characteristics of the fluid or semi-liquid material controlled or processed.

A further object is the provision of simplified valve and plunger construction wherein through the inherent characteristics of shape, compressibility, elasticity and reinforcement, plunger and/or valve operations may be attained with high efficiency and with smooth operation and elimination of leakage of the fluid material handled or processed.

More specifically it is an object to invent and disclose plunger and valve structure of the class described which provides a smooth, uniformly compressible contact and sealing body smoothly slidable with minimum resistance as a plunger or valve body but nevertheless maintaining closure and sealed relationship with a pressure cylinder or valve seat in its operational functions.

A still further object is the provision in an integral plunger and valve body of the class described of multifunctional zones or circular portions which closely cooperate to effect the unitary results and advantages previously enumerated.

These and other objects and advantages of my invention will more fully appear from the following description made in connection with the accompanying drawings wherein like reference characters refer to similar parts throughout the several views and in which:

Fig. 1 is an exploded view in cross section showing the important component parts of my plunger and valve structure before installation in a pressure cylinder or valve seat;

Fig. 2 is a view mostly in axial longitudinal section and partly in side elevation of an application of the structure for use in a high pressure grease gun;

Fig. 3 is a sectional view taken longitudinally of an application of the improved structure for use in a pitcher-pump assembly with an exemplification of the structure employed as the pump plunger; and Fig. 4 is a top plan view of the plunger valve body 5 with the disc washer removed.

Referring first to the important elements and factors of the plunger and valve body construction (see particularly Fig. 1), I provide a circular, preferably integral body indicated as an entirety by the numeral 5 constructed of relatively compressible, elastic, flexible, impervious material such as synthetic rubber. Synthetic rubber manufactured by Goodyear Rubber Company, under its exclusive trademark "Buna–N" is entirely suitable for my purposes.

The integral body 5 is of a general disc or circular piston shape having an external truncated conical peripheral contact surface 5a which tapers from the cylindrical at an angle approximating 15°. It is important that the rearward edge of the said circular peripheral surface 5a of the body be nicely rounded as shown, in a zone 5b, the arc of said rounding preferably being in a radius range between .035 and .055 inch.

The body 5 has an annular transverse zone or portion 5c defined in the form illustrated by parallel sides and the rearward end of the body is cylindrically recessed for substantial depth at 5d, leaving the annular, circular and pliable marginal sealing flange 5e which is possessed of the externally truncated conical contact surface 5a. For reinforcing purposes, a shallow bead 5f may be provided centrally of the recessed portion 5d although this is not necessary for the structure and efficiency of the invention.

At the forward end of the integral body a substantial circular reinforcing boss 5g is provided materially increasing the thickness and strength of the central zone of the body inwardly of the circumferential sealing flange and pliable transverse zone 5c thereof. The periphery 5h of the boss 5g as shown, is truncated conical for best cooperation with a rigid reinforcing washer later to be described, although this is not a necessary requirement.

The body 5 is provided with a cylindrical axial bore 5i which is purposely of a diameter slightly less than the rod or pin (later to be described) to which the body is affixed or connected.

In use as a plunger for a pump, grease gun or other material-extrusion medium or for use as a valve, the body 5 is positioned and affixed to a plunger rod 6 or a valve stem 7 as the case may be, of cylindrical form at its area of connection with the bore 5i of the body and of a diameter slighlty larger than the normal diameter of bore 5i. The bore 5i is smoothly formed and the body will expand adjacent the bore to cause an efficient seal to be set up between the axially apertured body and the valve stem.

In use the sealing flange 5b and the contact surface 5a smoothly engage and are compressed by a cylindrical or substantially cylindrical interior surface of a pressure cylinder or internal valve seat having a diameter substantially equal to the minimum or forward diameter of the truncated conical contact area or surface 5a.

Thus, in use and operation the greater portion or zone of the contact or sealing surface 5a is deformed inwardly through compression of the stock or material-forming the sealing flange 5a and also through rolling or curvature of the relatively thin, transverse annular zone 5c of the body.

The improved structure, as important elements thereof, preferably includes reinforcing media for both the forward end and rearward end of the integral body 5. To such ends, a disc washer 8 of circular configuration is axially superimposed upon and abuts the rearward annular end of the body 5 and is of a lesser diameter than said rearward end of the body, and preferably of slightly less diameter than the tapered forward end of the sealing flange portion 5e of the body. As shown, the washer 8 has an integral sleeve 8a extending rearwardly therefrom which with close working clearance surrounds the plunger rod 6 or valve stem 7 as the case may be, but which is spaced from the central web or hub of the body construction.

A second reinforcing circular washer 9 surrounds and embraces the forward axial boss 5g of the body, having as shown a truncated conical circumferential flange 9a which closely fits the complementary peripheral surface 5h of the boss. This washer as shown, also has a forward, narrow cylindrical flange 9b which with close working clearance engages the plunger rod 6 or valve stem 7 as the case may be.

One of the important uses of the invention as a plunger is exemplified in the grease gun assembly which is adapted for either bulk grease or cartridge container grease extrusion. Here the grease gun comprises a cylindrical body 10 in the form of an elongated sleeve having an externally threaded forward end 10a and an externally threaded rearward end 10b. The rear end 10b is closed by a truncated conical cap member 11 threadedly connected therewith which has an axial bore and slide bearing 11a for receiving an elongated plunger rod 12 disposed axially within the cylinder 10. A variably spiraled coil spring 13 is interposed between the rear cap member 11 and the disc washer 8 for applying forward pressure upon the plunger or piston comprising the integral member 5. In the grease gun illustrated adjacent the rear of the body or barrel 10, an inward restriction or annular abutment 10c is provided to limit rearward movement of the plunger or body 5.

At the forward end of cylindrical body 10, a head fitting indicated as an entirety by the numeral 14 is threadedly applied utilizing preferably a sealing gasket 14a which is of generally conventional structure and includes a check valve 15 disposed in an extrusion discharge passage 15a and an elongated grease pump 15 communicating with the discharge from the head which in turn, has check valve and discharge mechanism associated with the nozzle or forward end thereof.

The combination of our improved plunger reinforcing means and structure with a tensioned spring such as the spring 13 in the grease gun application described, is very important in producing a self-energized unit which inherently affords expansion to the peripheral portion of the plunger 5.

Thus, it will be seen, referring to Fig. 2, that in use of the grease gun illustrated the spring is tensioned by pulling back on the handle of the plunger rod 12 to contract the spring and the plunger may be retained in retracted position prior to filling of the forward end of the cylinder 10 with a cartridge or grease or other fluid or semi-solid material by affixing the rod through a detent in the retracted position.

Thereafter, when the forward portion of cylinder 10 is filled with material to be disposed, the rod is released from its detent or locking position and a pressure through spring 13 is applied to the rear reinforcing washer 8 behind plunger 5. This pressure applied through spring 13 energizes the plunger to expand outwardly in very tightly sealed relation relative to its peripheral sealing portion 5a and the internal peripheral surface of the cylinder 10. In the application of such pressure through the spring 13, the pliable and flexible plunger 5 is clamped between the forward washer 9 which confines the bossed central portion of the piston or plunger and the rigid rear washer 8. Such compression naturally expands to full limits, the circumferential area of the plunger proper and thereby very efficiently seals the same in the discharging stroke of the plunger. In this connection it will be noted that the rear washer 8 is of considerably smaller diameter than the overall diameter of the rear of plunger 5.

When the plunger is retracted for loading of the grease gun or other dispensing device, the spring pressure is released and the overall circumference of the recessed plunger 5 may be promptly reduced for efficient reaction thereof.

In Fig. 3, a pump assembly is illustrated, utilizing on the reciprocating plunger rod 16 the identical structure of the improved plunger media for sealed contact with a tubular cylinder 17 of the pump. In the lower portion of the tubular cylinder 17, a substantially cylindrical valve seat 18 is provided which cooperates with an embodiment of the invention, utilizing the integral body 5 with the reinforcing washers or discs 8 and 9 in the same combinative relation as previously described. Here the integral valve body 5 is disposed in sealed relation upon an axial valve pin 7 which has means provided thereon such as a head and clamping nut 7a for securing and retaining the forward and rearward reinforcing washers 9 and 8 of the structure.

In all uses of the improved construction as a piston or plunger for extrusion purposes or as a valve, the impervious peripheral contact surface 5a constantly engages the valve seat or pressure cylinder as the case may be. To this end, the compressibility of the annular sealing flange 5e in combination with the rolling or receding action of the annular zone 5c of the body provides an unusual and highly efficient resilient seal between the valve or piston body and its cylinder or seat.

In the retractive movement of the piston or valve body 5 the arcuately curved or rounded shoulder 5b at the free edge of the sealing flange 5e is of substantial importance in that it prevents crinkling or deformation of the body 5 during retractive movement thereof.

The reinforcement of critical portions of the plunger or valve body 5 by the forward, complementary formed washer 9 and the rearward reinforcing disc washer 8 is important and substantially requisite to the efficient functioning of the overall structure where substantial pressures are involved in the overall structure or system.

It will be understood that with the structure and composition of the integral body 5 and the inherent characteristics thereof, uniform contraction and rolling of parts is provided to attain leak-proof sealing engagement of the contact surface 5a of the body with cylinder or valve seat, as the case may be, throughout the cycle of operation of the structure.

It will of course be understood that various changes may be made in the form, details, arrangement and proportions of the parts without departing from the scope of my invention.

What is claimed is:

1. A plunger and valve structure comprising an integral body of flexible, elastic, impervious and compressible material having a generally circular configuration and an external contact peripherally of truncated conical, flaring shape and having a concentric, shallow cylindrical recess in the flared end thereof, said body providing a transverse medial, relatively thin, deformable portion or zone intermediate of the axis of said body and the contact peripheral surface thereof, and a thrust washer overlying the flared end of said body and overlying said cylindrical recess but of smaller external diameter than the flared end of said body.

2. The structure set forth in preceding claim 1 and said recess and periphery of said body defining an annular deformable sealing flange extending generally longitudinally of said body.

3. Plunger and valve structure comprising an integral body constructed of flexible, elastic and compressible material of generally circular configuration and having an external truncated conical peripheral shape, said body having a concentric shallow, cylindrical recess in the flared end thereof and having a concentric circular boss on the opposite end thereof, said recess being of substantially larger diameter than said boss to provide a pliable transverse circular zone adjacent the peripheral portion of said body and defining with said truncated conical periphery, a pliable annular flange, said boss providing a substantially less pliable central zone in the transverse portion of said body, a disc plunger washer disposed concentrically of said body and overlying the inner zone portion of said pliable annular flange and a reinforcing circular washer of substantially rigid material encircling and reinforcing said boss.

4. The structure set forth in claim 3 wherein said pliable, annular flange normally has a truncated conical peripheral surface, said surface terminating at its larger end in a smoothly rounded annular shoulder.

5. Plunger and valve structure comprising an integral body constructed of flexible, elastic impervious and compressible material having a contact-periphery of truncated conical shape and having a concentric shallow recess in the flared end thereof, said body with said recess portion providing a transverse medial relatively thin, deformable zone intermediate of the axis and the contact peripheral surface thereof and also defining an annular deformable sealing flange extending generally longitudinally of said body, a disc plunger washer disposed concentrically of said body and overlying the inner zone portion of said deformable annular flange and of smaller diameter than the external diameter of said flared end and a coil spring applying pressure against said disc washer to enlarge said deformable annular zone of said body during the pressure stroke of said plunger.

References Cited in the file of this patent

UNITED STATES PATENTS

| 2,036,038 | Gottlieb | Mar. 31, 1936 |
| 2,118,604 | Heildloff | May 24, 1938 |
| 2,545,319 | Sundholm | Mar. 13, 1951 |
| 2,702,220 | Johnson | Feb. 15, 1955 |
| 2,754,164 | Schwarz | July 10, 1956 |

FOREIGN PATENTS

| 770,988 | France | July 16, 1934 |